United States Patent [19]

Moriki et al.

[11] Patent Number: 4,621,491
[45] Date of Patent: Nov. 11, 1986

[54] METHOD OF DISCRIMINATING FITTING PRESSURE FOR LINKS ON A TRACK PRESS

[75] Inventors: Yasumitsu Moriki; Akira Tanaka; Izumi Takahashi, all of Tokyo, Japan

[73] Assignee: Maruma Jyusharyo Kabushiki Kaisha, Tokyo, Japan

[21] Appl. No.: 748,001

[22] Filed: Jun. 24, 1985

[51] Int. Cl.[4] ............................................. B21L 9/06
[52] U.S. Cl. ........................................ 59/7; 59/35.1; 29/718; 29/525
[58] Field of Search ...................... 59/5, 7, 8, 12, 35.1; 29/525, 713, 718

[56] References Cited

U.S. PATENT DOCUMENTS 3,412,451 11/1968 Vieser et al. ........................ 29/718

FOREIGN PATENT DOCUMENTS 8101806 6/1981 PCT Int'l Appl. .................... 59/35

Primary Examiner—Francis S. Husar
Assistant Examiner—David B. Jones
Attorney, Agent, or Firm—Robert E. Burns; Emmanuel J. Lobato; Bruce L. Adams

[57] ABSTRACT

Method to properly discriminate fitting pressure of articulated track links. Loading pressure in the ram of a track press is compared with both the lower and upper limit pressure values which are prescribed with reference to the range of fitting pressure specified for the links. Fitting of a link is determined acceptable when a sum of the press loading time is longer than a predetermined value while press pressure is maintained within the range between both the lower and upper pressure values; whereas it is determined unacceptable when the sum of press loading time is shorter than the predetermined one or when time in which press pressure exceeds the upper limit pressure is longer than a predetermined time.

3 Claims, 6 Drawing Figures

METHOD OF DISCRIMINATING FITTING PRESSURE FOR LINKS ON A TRACK PRESS

BACKGROUND OF THE INVENTION

1. Field of the Invention

The present invention relates to a method of discriminating fitting pressure during an assembling operation of articulated track links on a track press and more particularly to a method of discriminating whether or not each of the links constituting a line of track chain is press fitted onto a pin rotatably held in a bushing within a properly determined range of fitting pressure when the track chain is assembled for tractor or the like track vehicles.

2. Description of the Prior Art

As is well know, fitting pressure for links is specified for each of the kinds of track vehicles such as a tractor or the like. For this reason pressure fitting is achieved within the specified pressure range when a line of articulated track chain is assembled.

Discriminating of fitting pressure is hitherto achieved by visually confirming that a pressure gauge for indicating ram pressure in a track press indicates the existing pressure higher than the minimum value or lower than the maximum value. However, the conventional method of discriminating fitting pressure has drawbacks in that discriminating is achieved at a lower operational efficiency and an intensity of press fitting fluctuates from link to link because the pressure gauge fails to indicate actual fitting pressure because it indicates also instantaneous peak pressure.

When the conventional simple method of discriminating fitting pressure is employed, a link is determined unacceptable if the press pressure detected by the pressure gauge instantaneously exceeds a predetermined upper limit but in practical press working there tends to be instantaneously generated excessively high pressure due to existence of the burr or small projection on the fitting surface. However, experiences illustrate that the link which is subjected to press fitting with normal fitting pressure after removal of a burr or small projection is different from the case when a link is press fitted with excessively high fitting pressure and therefore the first mentioned link maintains a normal intensity of the press fitting.

SUMMARY OF THE INVENTION

Thus, the present invention has been made with the foregoing background in mind.

The present invention is intended not to detect that press pressure used for an assembly operation is held at a level higher than the upper limit value or lower than the lower limit value but to make a decision as to whether the applied fitting pressure is acceptable or unacceptable in dependence on the fact that the time in which pressure kept in the specified range of pressure is loaded within a predetermined pushing time T or the press fitting distance is longer than a predetermined time. Further, the present invention is intended not to determine as unacceptable a press fitting immediately when it is found that pushing or press time is shorter than the predetermined time even when press pressure exceeds the upper limit value whereby an average intensity of press fitting or fitting pressure is utilized as a standard for making a decision.

Specifically, a basic principle of the present invention is such that the case where a predetermined press fitting time T, as measured from the point of time when the end faces of pins or bushings come in engagement to the fitting holes in a link to start a fitting operation or a sum $\Sigma t_a$ of press loading time for which press pressure is maintained within a range, as defined between both the predetermined lower and upper limit pressures while press fitting is achieved by a press fitting distance, is longer than a predetermined value relative to the predetermined fitting time is determined acceptable and in the case where the same is shorter than the aforesaid value is determined unacceptable.

In addition to the fact that press fitting is determined acceptable or unacceptable in accordance with the principle of the invention as described above, the case where time $t_b$ in which fitting pressure exceeds the upper limit pressure level is longer than a predetermined time R is detected as unacceptable.

According to the invention fitting time T is determined in dependence on the length of the link fitting holes 7 (see FIG. 1), provided that an operational speed of the ram is maintained constant, and it has a certain relation relative to the distance of press fitting of the links. For this reason either of the fitting time and the fitting distance may be employed as a standard for carrying out the method of the invention. However, the description will be made below as to the case where fitting time is employed as the standard for the purpose of simplification of illustration and description.

Predetermined value S is represented in the form of percentages relative to fitting time T and it is normally determined in the range of 55 to 88%.

Now, time $\Sigma t_a$ in which press pressure exceeds the lower limit pressure value or it is maintained within the range of pressure higher than the lower limit pressure and lower than the upper limit pressure during the step of press working, that is, for the period of fitting time T has a certain relation relative to the fitting time T when the relation is represented in the form of ratio (Q%) as follows.

$$Q = \left( \frac{\Sigma t_a}{T} \times 100 \right) \% \quad (1)$$

Thus, discrimination is carried out by comparing processing result Q with predetermined value S.

Further, according to the invention time R in which pressure in excess of the upper limit value PH is permissively loaded is experientially determined in dependence on the surface condition of the pin and other components. In practice, it is normally determined in the range of 0.3 to 0.5 second.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in greater detail hereunder with reference to the accompanying drawings which schematically illustrate a preferred embodiment of the invention.

Figure 1:
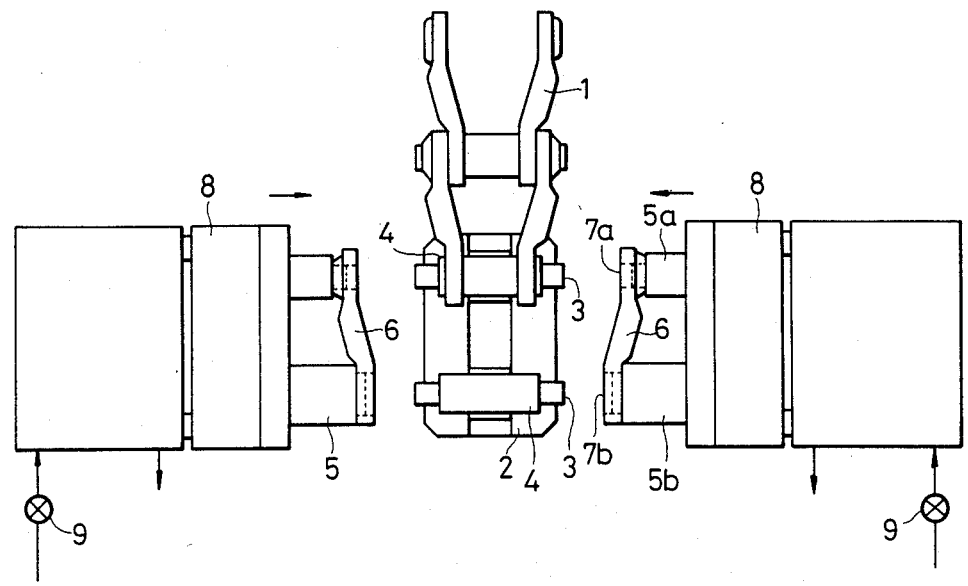
FIG. 1 is a fragmentary plan view of a track press, illustrating how assembly is successively effected for links.

Refering first to FIG. 1, a line of track chain 1 is successively assembled by way of the steps of causing fitting holes 7a and 7b on an opposing pair of track links 6 to come in fitting engagement onto both the end parts of pins 3 rotatably held in bushings 4 which are placed on the jaw insert 2 and repeating the foregoing operation for other links to be assembled articulated on the track chain 1.

In the drawing reference numeral 8 designates a pushing ram. As is apparent from the drawing, two pushing rams 8 are mounted in symmetrical relation relative to the jaw insert 2 and they are actuated separately to move back and forth. Further, reference numeral 9 designates a pressure sensor which is disposed midway of the hydraulic circuit for each of the rams 8.

Figure 2:
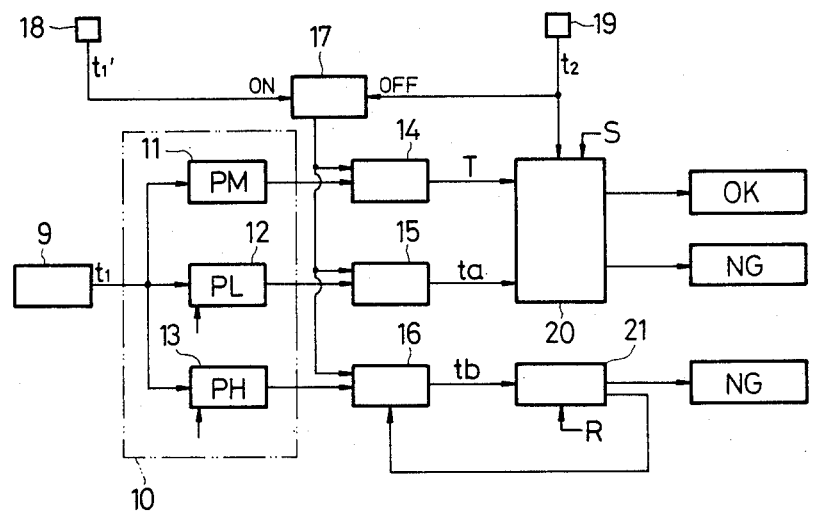
FIG. 2 is a block diagram illustrating electrical circuits for controlling operation of the fitting pressure discriminating apparatus.

An example of discriminating apparatus to which the present invention is applied is illustrated in FIG. 2. An electrical output from the pressure sensor 9 is applied into a meter relay 10 in the illustrated embodiment.

The meter relay 10 includes a switching circuit 11 adapted to output ON signals after the pressure changing point $t_1$ is detected, outputting of ON signals is effected irrespective of how the pushing pressure varies, a lower limit level switch 12 is adapted to output ON signals only when the input is compared with a predetermined lower limit value PL and it is found that the former exceeds the latter and an upper limit level switch 13 is adapted to generate an output when it is found that the input exceeds a predetermined upper limit level switch 13. Output from each of the above-mentioned switches becomes a corresponding gate signal for respective pulse counters 14, 15 and 16.

Incidentally, the gate signal for the pulse counter 15 may be a logic the output comprising output from the lower limit level switching circuit 12 and the output from the upper limit level switching circuit 13. Alternatively, it may be an output only from the lower limit level switching circuit 12, because the predetermined allowable time R is short and an NG signal is outputted in such a manner as described later when an inequality $R < t_b$ is established.

In the drawing reference numeral 17 designates a clock pulse generator adapted to be activated by means of a pressure switch 18 which serves to detect the pushing operation of the ram and stop its operation in response to a signal output from a position switch 19 which serves to output a signal which represents the completion of pushing operation (the extreme end of the fitting operation).

Further, in the drawing reference numeral 20 designates a processing and discriminating circuit. This circuit 20 is adapted to calculate the time $\Sigma T_a$ in which an inequality PH>PL is established during time T of the step of the pushing operation or in which the input exceeds PL and moreover carry out processing in accordance with the formula (1) to generate an OK signal when an inequality $S \leq Q$ is established as a result of comparing Q (result of processing) with S (predetermined value) and generate an NG signal when an inequality $S > Q$ is established in the same way whereby an alarm device such as buzzer, lamp or the like means is activated.

Figure 3:
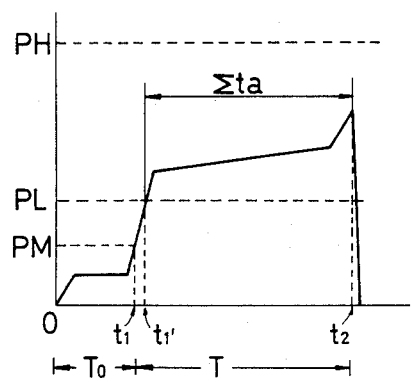
FIGS. 3 to 6 are each a graph illustrating a relation of fitting pressure versus time respectively.
Figure 4:
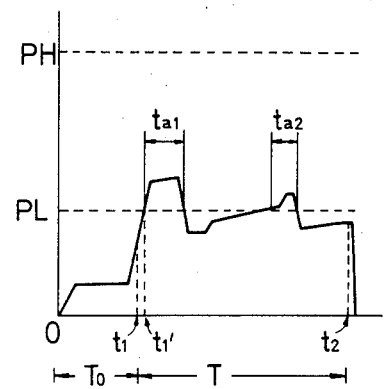

Specifically, when the press pressure varies properly as illustrated in FIG. 3, this operating state is naturally represented by an OK signal but when time $\Sigma t_a = t_{a1} + t_{a2} + \cdots$ in which press pressure is maintained within a specified pressure range during time T of the step of the pushing operation is short and the processing result Q is smaller than predetermined value S as illustrated in FIG. 4, an NG signal is outputted.

The counter 16 outputs a pulse signal equivalent to excessive time $t_b$ when press pressure exceeds PH. Further, the comparing circuit 21 makes a comparison between the excess time $t_b$ and the predetermined time R so that it outputs an NG signal when an inequality $t_b > R$ is established and at the same time interrupts feeding of pressurized hydraulic oil to the ram cylinder. However, when an inequality $t_b \leq R$ is established, a signal is generated which clears the content contained in the counter 16.

Figure 5:
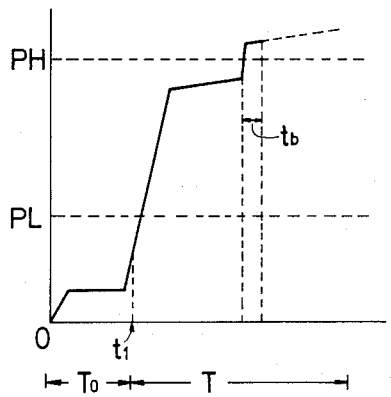
Figure 6:
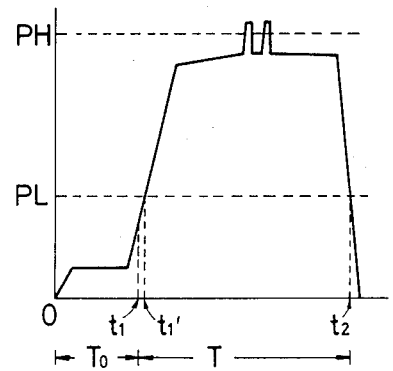

For this reason the NG signal is generated in the case as illustrated in FIG. 5 but no NG signal is outputted in the case as illustrated in FIG. 6.

The position switch 19 disposed in the discriminating apparatus as described above can be utilized as a limit switch for limiting press fitting length for a certain link, wherein the press fitting length varies in dependence on the type of track press used for the above-mentioned purpose.

It should of course be understood that the meter relay 10 may be fully replaced with an electronic circuit.

While the present invention has been described above with respect to a single preferred embodiment thereof, it may be changed or modified in any suitable manner without any departure from the spirit and scope of the invention as defined by the appended claims.

What is claimed is:

1. A method of discriminating fitting pressure during an assembly operation for articulated track links on a track press essentially comprising the steps of:
    detecting loading pressure in a ram during assembling operation of a link,
    comparing the detected loading pressure with a lower limit pressure value as well as a upper limit pressure value both of which are predetermined with reference to a range of fitting pressure specified for the link,
    predeterming allowable time in which loading pressure in execss of the predetermined upper limit pressure value can be loaded, and
    carrying out discrimination in dependence on whether or not a sum of pressure loading time at a level of loading pressure higher than the predetermined lower limit pressure value during the pushing operation of the track press is longer than a predetermined time, while excess pressure appearing within the allowable time during the pushing operation of the track press is neglected.

2. A method as defined in claim 1, wherein fitting of a link is determined acceptable when a sum of press loading time is longer than a predetermined value while press pressure is maintained within the range between the predetermined lower and upper pressure values and fitting of the link is determined unacceptable when the sum of press loading time is shorter than the predetermined one.

3. A method as defined in claim 1, wherein fitting of a link is determined unacceptable when time in which press pressure exceeds the upper limit pressure value is longer than a predetermined time during a fitting operation.

* * * * *